(12) United States Patent
Young, IV

(10) Patent No.: US 7,922,128 B2
(45) Date of Patent: Apr. 12, 2011

(54) CABLE MANAGEMENT APPARATUS, SYSTEM, AND FURNITURE STRUCTURES

(75) Inventor: James A. Young, IV, Everett, WA (US)

(73) Assignee: Slam Brands, Inc., Redmond, WA (US)

( * ) Notice: Subject to any disclaimer, the term of this patent is extended or adjusted under 35 U.S.C. 154(b) by 256 days.

(21) Appl. No.: 11/877,451

(22) Filed: Oct. 23, 2007

(65) Prior Publication Data

US 2009/0101762 A1  Apr. 23, 2009

(51) Int. Cl.
*F16M 5/00* (2006.01)
(52) U.S. Cl. ............. 248/56; 248/49; 248/65; 248/68.1; 248/79
(58) Field of Classification Search ............ 248/49, 248/56, 65, 68.1, 79, 512
See application file for complete search history.

(56) References Cited

U.S. PATENT DOCUMENTS

| | | | | |
|---|---|---|---|---|
| 2,573,600 A * | 10/1951 | Pruehs | ...................... | 174/153 G |
| 2,922,836 A * | 1/1960 | Brown | ............................ | 277/606 |
| 3,092,361 A * | 6/1963 | Cook | ............................ | 248/56 |
| 3,564,113 A * | 2/1971 | Kindler | ........................ | 174/656 |
| 3,582,030 A * | 6/1971 | Barrett, Jr. | .................. | 248/68.1 |
| 3,809,798 A * | 5/1974 | Simon | ............................. | 174/59 |
| 3,958,300 A * | 5/1976 | Tanaka | ......................... | 174/68.1 |
| 4,482,172 A * | 11/1984 | DeVera et al. | ............. | 285/140.1 |
| 4,517,408 A * | 5/1985 | Pegram | ..................... | 174/153 G |
| 4,797,507 A * | 1/1989 | Lofving | ........................ | 174/503 |
| 4,857,674 A * | 8/1989 | Filbert | .......................... | 174/135 |
| 5,090,644 A * | 2/1992 | Lenker | ........................... | 248/56 |
| 5,090,645 A * | 2/1992 | Zuercher | ...................... | 248/68.1 |
| 5,254,808 A * | 10/1993 | Rodrigues et al. | ............ | 174/660 |
| 5,526,549 A * | 6/1996 | Mori et al. | ...................... | 16/2.1 |
| 5,563,378 A * | 10/1996 | Uchida et al. | ................. | 174/135 |
| 5,693,910 A * | 12/1997 | Gretz | ............................. | 174/669 |
| 5,702,076 A * | 12/1997 | Humber | ......................... | 248/57 |
| 6,012,683 A | 1/2000 | Howell | | |
| 6,375,017 B1 * | 4/2002 | Schattner et al. | .......... | 211/85.13 |
| 6,545,863 B2 | 4/2003 | Huggins | | |
| 6,598,835 B2 * | 7/2003 | Minnick | ......................... | 248/56 |
| 6,615,551 B2 | 9/2003 | Chesser et al. | | |
| 6,753,470 B1 * | 6/2004 | Johnson | ........................ | 174/481 |
| 6,768,057 B2 * | 7/2004 | Blake | ............................. | 174/653 |
| 6,951,324 B2 * | 10/2005 | Karamanos | ................... | 248/68.1 |
| 6,995,316 B1 * | 2/2006 | Goto | .............................. | 174/659 |
| 6,996,904 B1 | 2/2006 | Howell | | |
| 7,026,553 B2 | 4/2006 | Levesque et al. | | |
| 7,059,895 B2 | 6/2006 | Murano | | |
| 7,071,418 B2 * | 7/2006 | Brockman et al. | ............ | 174/154 |
| 7,098,401 B1 * | 8/2006 | Herald et al. | .................. | 174/652 |
| 7,464,966 B2 * | 12/2008 | Miyajima et al. | ............. | 285/124.3 |
| 7,500,644 B2 * | 3/2009 | Naudet et al. | ............... | 248/68.1 |
| 2003/0222185 A1 * | 12/2003 | Rubenstein et al. | ......... | 248/68.1 |

(Continued)

*Primary Examiner* — Terrell Mckinnon
*Assistant Examiner* — Michael McDuffie
(74) *Attorney, Agent, or Firm* — Turocy & Watson, LLP

(57) ABSTRACT

A one-piece easily manufactured and economical unitary product that both facilitates the routing of cable and the storage of extra lengths of cable is provided in one embodiment by a cable management apparatus including a flange mate-able with an opening and a cable management structure connected to the flange. In various exemplary non-limiting embodiments, the innovation provides multimedia furniture that includes structure for supporting an entertainment device, at least one outwardly facing rear section, wherein the at least one outwardly facing rear section includes an opening through which a cable is receivable and a cable management apparatus disposed on the outwardly facing rear section, the cable management apparatus includes a flange mate-able with the opening and a cable management structure connected to the flange.

20 Claims, 9 Drawing Sheets

U.S. PATENT DOCUMENTS

| | | | |
|---|---|---|---|
| 2004/0026103 A1* | 2/2004 | Henriott et al. | 174/48 |
| 2005/0077436 A1* | 4/2005 | Nelson | 248/68.1 |
| 2005/0109885 A1* | 5/2005 | Welsh | 248/56 |
| 2006/0108481 A1* | 5/2006 | Riedy et al. | 248/68.1 |
| 2006/0113432 A1* | 6/2006 | Driskell | 248/68.1 |
| 2007/0007397 A1* | 1/2007 | Nelson | 248/68.1 |
| 2007/0114339 A1* | 5/2007 | Winchester | 248/68.1 |
| 2007/0246613 A1* | 10/2007 | Kennedy | 248/56 |

* cited by examiner

CABLE MANAGEMENT APPARATUS, SYSTEM, AND FURNITURE STRUCTURES

FIELD OF THE INVENTION

The present innovation is directed generally to entertainment and/or multimedia furniture, and more specifically to cable management apparatus that can be used independently or incorporated or integrated with entertainment center furniture such as for example but not limited to multimedia furniture that houses media devices, consoles, computers, peripherals, and/or media storage.

BACKGROUND OF THE INVENTION

For decades, entertainment devices such as networked and standalone media devices and computing devices/components have been continually invading the living room, home offices, bedrooms, basements, conference rooms, commercial spaces, etc. However, at the same time, generally speaking, some of the furniture that has been employed to house these devices and peripherals has remained static in terms of its functionality. For instance, "coffee tables" have largely remained the same. For another example, while the notion of a "TV stand" has existed, i.e., a stand suited for supporting a television (TV), the TV stand in its various formations tends to be little more than a flat surface with shelves or drawers underneath.

Through time, some of the furniture that has been employed to house these devices and peripherals has changed, for example, the TV stand has morphed into entertainment centers that house a plurality of entertainment devices and can include one or more hinged doors on the front to shield the entertainment devices (gaming consoles, games, Digital Video Disk (DVD) players, Compact Disk (CD) players, set top boxes, Video Cassette Recorders (VCRs), etc.) from view and/or from damage. Most if not all of the plurality of entertainment devices plug into a wall outlet to receive electrical power. Additionally, many times other cables interconnect different devices or other data sources such as the Internet, a video digital recorder (VDR), a game console, a display, and/or a computer.

For example, it is not uncommon, to have a satellite receiver having a cable going to a satellite dish and having a cable going to a VCR or DVR that in turn has a cable connected to a game console that is connected to a display device. Additionally, there can be multiple speaker wires. In some instances, wire management in an entertainment center environment is very difficult both from a functional aspect and from an aesthetic aspect. Accordingly, for these and other reasons, an improved cable management apparatus that can be incorporated or integrated with targeted entertainment centers that house media consoles, peripherals and/or media devices and content is desired. Because the type of wiring employed is limitless, for example, some devices utilize phone lines, as employed herein the term cable means all wiring whatsoever such as coaxial cable, two wire speaker wire, Cat 5 cable, electrical cords, a single wire, etc.

SUMMARY OF THE INVENTION

In various exemplary non-limiting embodiments, the innovation provides an easily manufactured and economical product that both facilitates the routing of cable and the storage of extra lengths of cable. In various exemplary non-limiting embodiments, the innovation provides multimedia furniture that includes structure for supporting an entertainment device, at least one outwardly facing rear section, wherein the at least one outwardly facing rear section includes an opening through which a cable is receivable and a cable management apparatus is disposed on the outwardly facing rear section, the cable management apparatus including a flange mate-able to the opening, and a cable management structure is connected to the flange. The cable management apparatus can be a one-piece unitary easily manufactured and economical product that both facilitates the routing of cable and the storage of extra lengths of cable.

For better integration of media devices having cables to the media devices or from the media devices while the devices are positioned in a multimedia furniture such as an entertainment center, the innovation also may include structure for the routing of cable and the storage of extra lengths of cable. For instance, in one exemplary non-limiting embodiment, a cable management system includes a surface including a plurality of openings, and a plurality of cable management apparatus is inserted into at least two of the plurality of openings, wherein each of the cable management apparatuses includes a flange mated with the opening, and a cable management structure connected to the flange. The cable management structure can be connected to the flange via a collar member that can be sized the same as a width of the opening such that the flange is on one side of the opening and the cable management structure extends from the other side of the opening. The cable management apparatuses can all be a one-piece unitary easily manufactured and economical product that both facilitates the routing of cable and the storage of extra lengths of cable.

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments of the innovation in a simplified form as a prelude to the more detailed description that follows.

BRIEF DESCRIPTION OF THE DRAWINGS

The cable management apparatuses that can be employed independently or incorporated or integrated with entertainment center furniture structures of the innovation are further described with reference to the accompanying drawings in which.

DETAILED DESCRIPTION OF ILLUSTRATIVE EMBODIMENTS

Overview

Figure 1A:
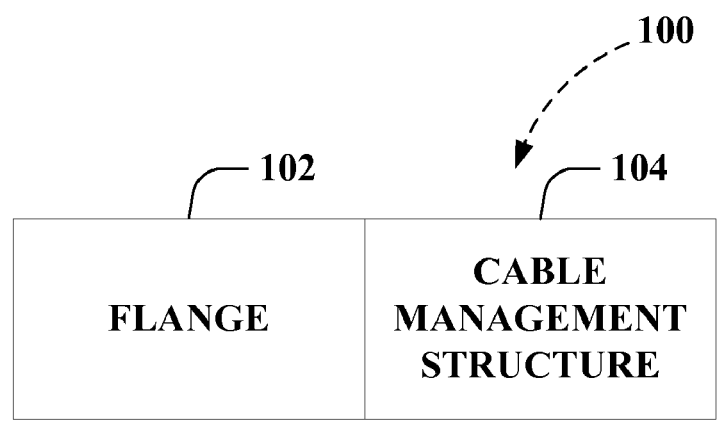
FIG. 1a is a schematic view of a cable management apparatus in accordance with the innovation.

As described in the background, traditional entertainment center furniture has been somewhat tailored to the media equipment space that has evolved in the living spaces everywhere. Typically a media device or console includes data for more than one medium such as data for both video and audio, and as such, the terms multimedia and media are employed interchangeably herein. While some prior art furniture is provided with generic shelves, drawers and/or swing doors on hinges so that a user can place a console inside on a shelf, in a drawer and/or swing a door shut to enclose the console, such furniture is generic by nature in that shelves and drawers can house any item. In most cases, a plurality of openings are provided in a back wall to enable cables to be provided to devices inside the furniture as well as to allow power cords to exit the furniture. However organization of the cables has heretofore been problematic.

In various exemplary non-limiting embodiments, the innovation provides an easily manufactured and economical product that both facilitates the routing of cable and the storing of excess lengths of cable (slack cable). In various exemplary non-limiting embodiments, the innovation provides multimedia furniture that includes structure for supporting an entertainment device, at least one outwardly facing rear section, wherein the at least one outwardly facing rear section includes an opening through which a cable is receivable and a cable management apparatus disposed on the outwardly facing rear section, the cable management apparatus including a flange mate-able with the opening and a cable management structure connected to the flange. The cable management apparatus can be a one-piece easily manufactured and economical unitary product that facilitates the routing of cable.

In addition, in another aspect of the innovation, for better integration of media devices having cables to the media devices or from the media devices while the devices are positioned in a multimedia furniture such as an entertainment center, the innovation also may include structure for the routing of cable and the storage of extra lengths of cable. For instance, in one exemplary non-limiting embodiment, a cable management system includes a surface including a plurality of openings, and a plurality of cable management apparatuses inserted into at least two of the plurality of openings, wherein each of the cable management apparatuses includes a flange mated with the opening, and a cable management structure connected to the flange. The cable management structure can be connected to the flange via a collar member that can be sized the same as a width of the opening such that the flange is on one side of the opening and the cable management structure extends from the other side of the opening. The cable management apparatuses can all be a one-piece easily manufactured and economical unitary product that both facilitates the routing of cable and the storage of extra lengths of cable.

Exemplary Non-Limiting Uniform Grommet Cable Management Apparatus

Figure 1B:
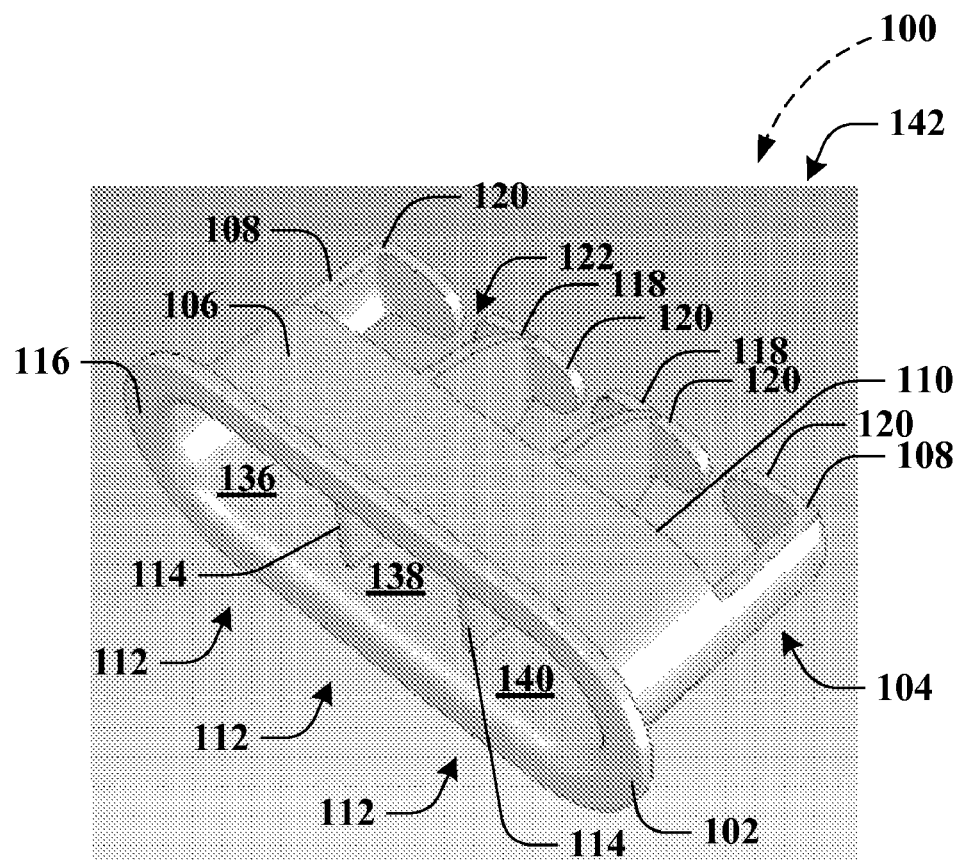
FIG. 1b is a front perspective view of a cable management apparatus in accordance with the innovation.
Figure 1C:
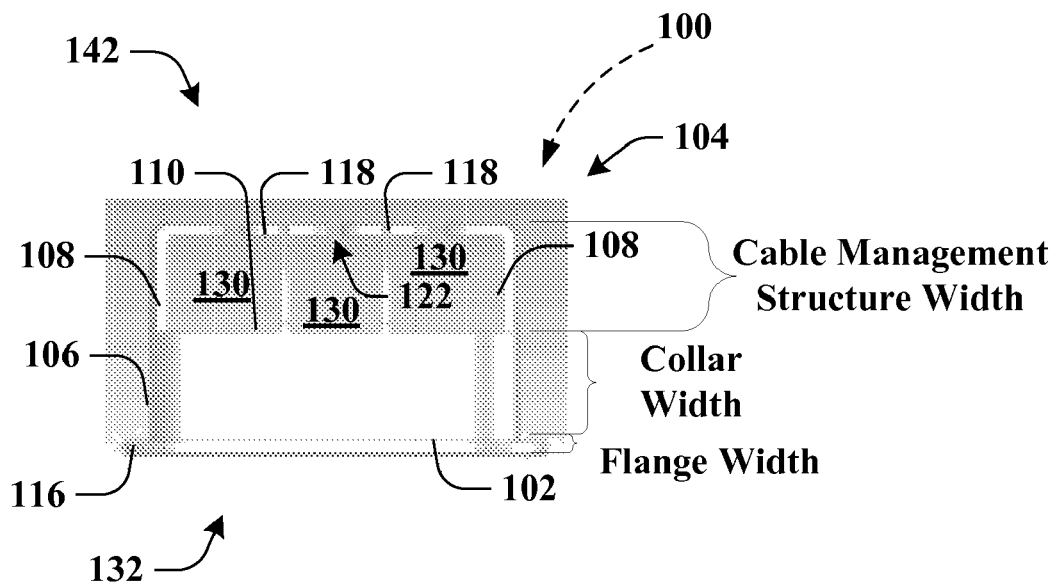
FIG. 1c is a side plan view of a cable management apparatus in accordance with the innovation.
Figure 1D:
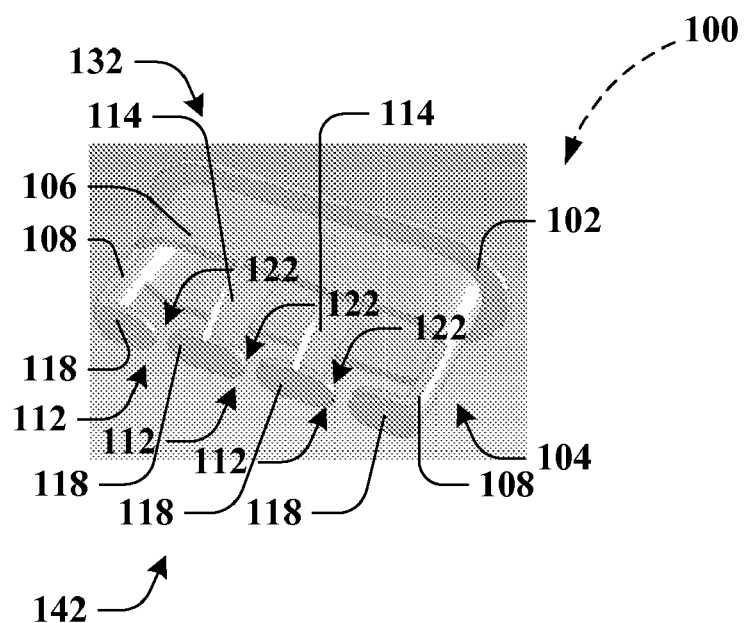
FIG. 1d is a back perspective view of a cable management apparatus in accordance with the innovation.
Figure 1E:
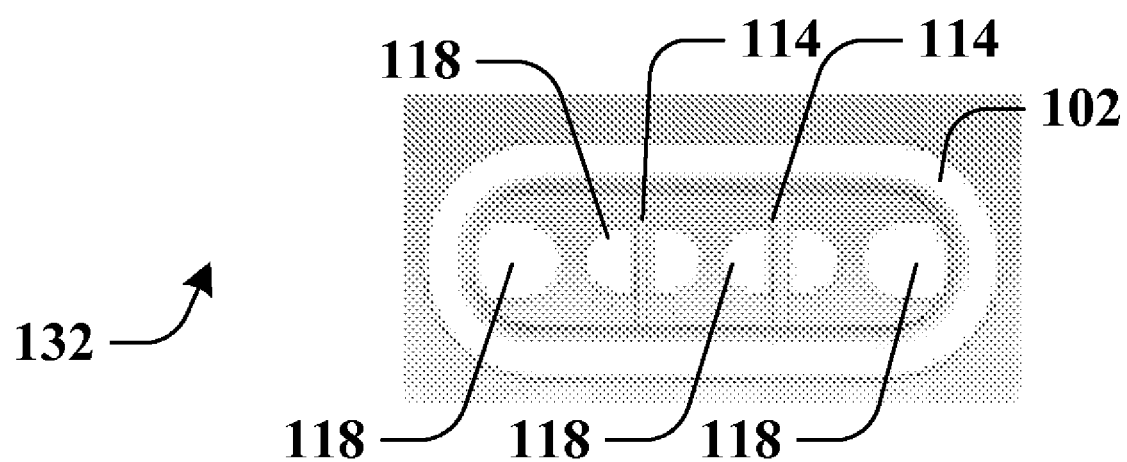
FIG. 1e is a front plan view of a cable management apparatus in accordance with the innovation.

As described herein, various embodiments of the present innovation relate generally to entertainment and/or multimedia furniture, and more specifically to cable management apparatus(es) that can be employed independently or incorporated or integrated with entertainment center furniture such as, for example, but not limited to, multimedia furniture that houses media devices, consoles, computers, peripherals, and/or media storage. As shown in FIGS. 1a-1e for instance, one of ordinary skill in the entertainment center art can appreciate that there are a variety of uses for a cable management apparatus 100. FIG. 1a is a schematic view of a cable management apparatus 100, FIG. 1b is a front perspective view of the cable management apparatus 100, FIG. 1c is a side plan view of the cable management apparatus 100, FIG. 1d is a rear perspective view of the cable management apparatus 100, and FIG. 1e is a front plan view of the cable management apparatus 100.

The cable management apparatus 100 includes a flange 102 mate-able with an opening and a cable management structure 104 connected to the flange 102. In one exemplary non-limiting embodiment, the cable management apparatus 100 includes a collar member 106 coupling the flange 102 and the cable management structure 104. Two end guide members 108 extend from a backside 110 (or back edge 110) of the collar member 106. A plurality of separate cable paths 112 are defined by a plurality of walls 114 within the collar member 106. In one exemplary non-limiting embodiment, the collar member 106 is sized the same width as the wall the cable management apparatus 100 is mounted to and when the flange 102 is against one side of the wall, the cable management structure 104 extends out from the other side of the wall. In one exemplary non-limiting embodiment, the walls 114 are recessed with respect to a front portion 116 of flange 102. A plurality of inner guide members 118 extend from the walls 114, in one exemplary non-limiting embodiment. The end guide members 108 and the inner guide members 118 terminate at arcuate members 120 which are in a plane parallel a plane defined by the front 116 of flange 102. This parallelity is best seen in FIG. 1c.

More particularly, the arcuate members 120 of the inner guide members 118 are ovals and the arcuate members 120 of the end guide members 108 are half ovals. FIG. 1c also best illustrates that volumes 130 defined by the end guide members 108 and the inner guide members 118 are substantially equal and in this respect the cable management apparatus 100 is a uniform grommet cable management apparatus 100. Grommet cable management apparatus 100 is typically inserted in grommet fashion in an entertainment center type furniture and includes a grommet side 132 and a back side 142. The grommet side 132 is what a user views when looking at the front side of the entertainment center and is best illustrated in FIG. 1e. The back side 142 is what the user views when looking at the back side of the entertainment center.

Figure 4A:
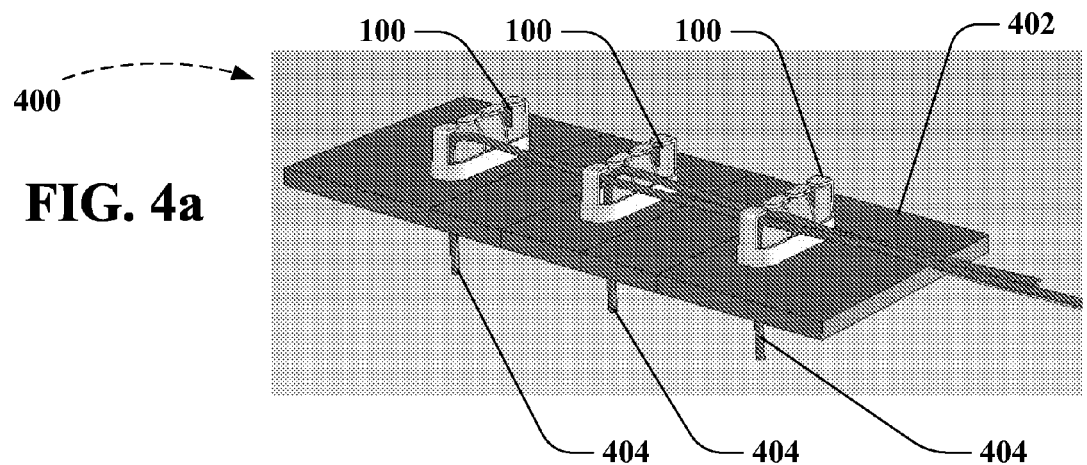
FIG. 4a is a back perspective horizontal view of a cable management apparatus environment in accordance with the innovation.
Figure 4B:
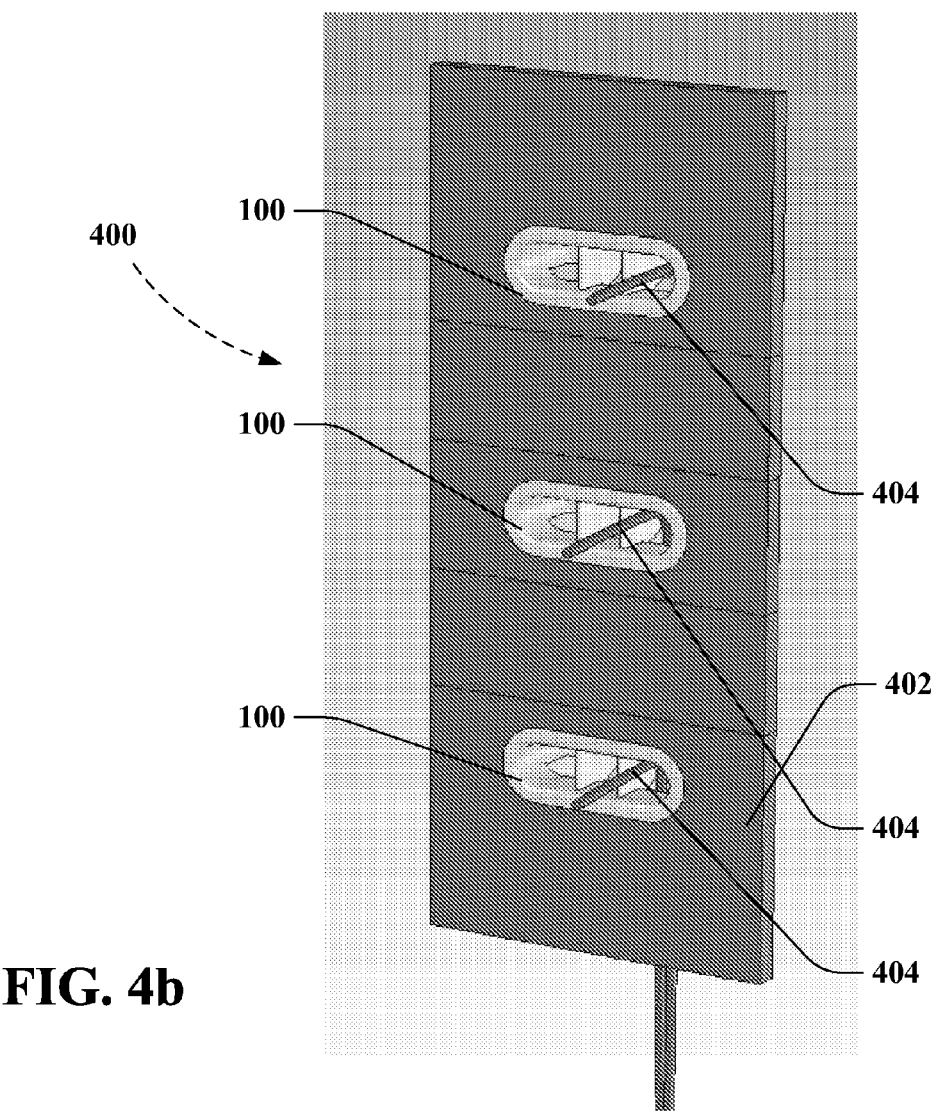
FIG. 4b is a front perspective vertical view of a cable management apparatus environment in accordance with the innovation.
Figure 4C:
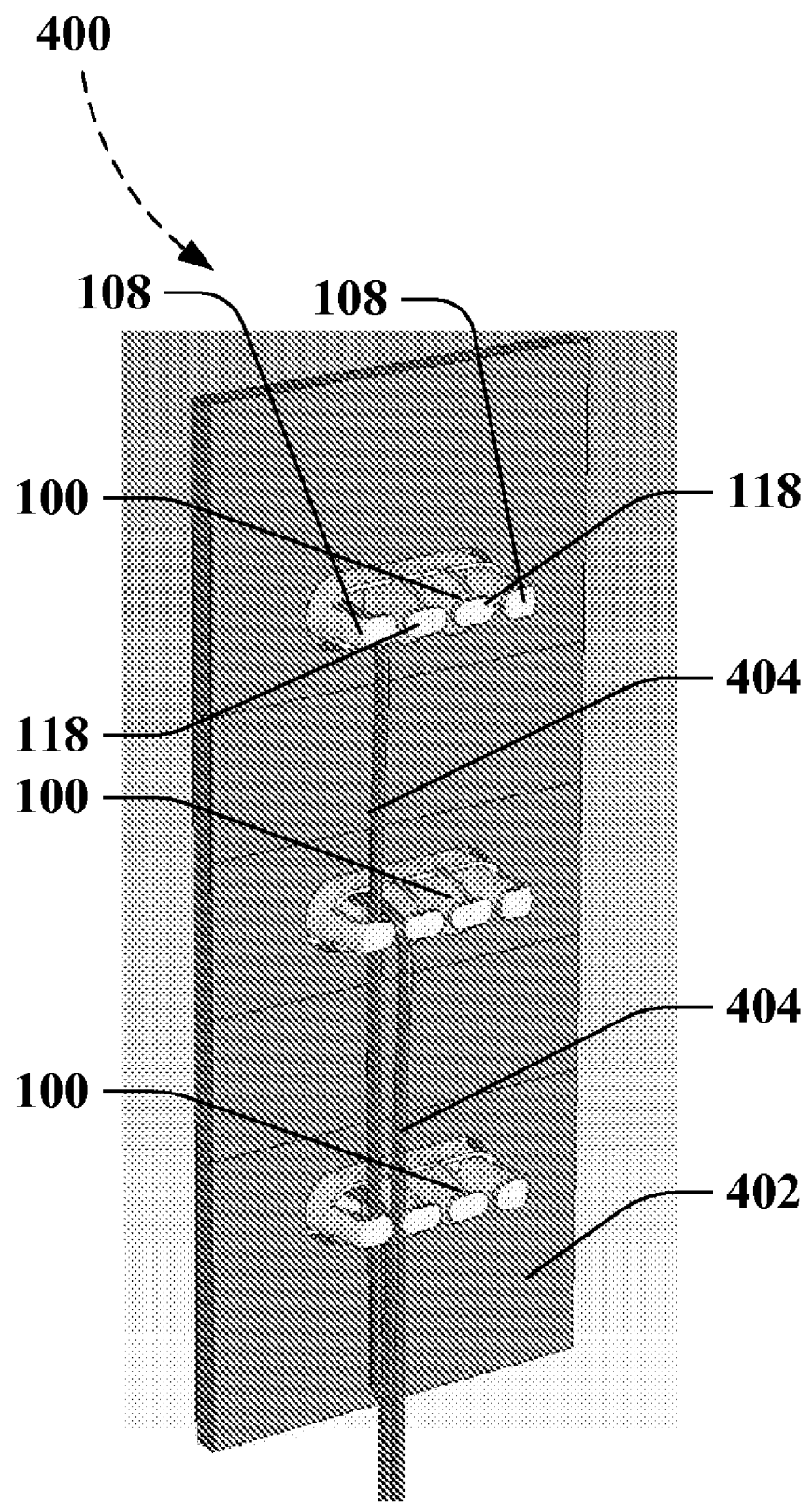
FIG. 4c is a back perspective vertical view of a cable management apparatus environment in accordance with the innovation.

In one exemplary non-limiting embodiment, the arcuate members 120 are flexible and this flexibility facilitates the placement of a cable in the cable management apparatus 100 by allowing a cable to be passed into one of the separate paths 112 from the grommet side 132, through the collar 106 and placed above an end guide member 108 and an inner guide member 118 and then the cable can be pulled down resulting in a cable that horizontally enters the cable management apparatus 100 from the grommet side 132 and then exits the back side 142 in a vertically down direction as illustrated in FIGS. 4b and 4c. Also, with a flexible cable, and the cable management apparatus 100 being in an opening, as the cable is passed through the grommet side 132 of a separate path 112, gravity acts such that the cable exits the back side 142 in a downward direction as illustrated in FIGS. 4b and 4c, the user can leave the cable as is or the user can take the cable from the backside of the cable management apparatus 100 and pull the cable upwards through a gap 122 between the arcuate members 120 if an upward or horizontal cabling is desired.

In one exemplary non-limiting embodiment, cable management apparatus 100 is fabricated from an Acrylonitrile Butadiene Styrene (ABS) plastic that is a copolymer made by polymerizing styrene and acrylonitrile in the presence of polybutadiene. The proportions can vary from 15 to 35% acrylonitrile, 5 to 30% butadiene, and 40 to 60% styrene. The result is a long chain of polybutadiene crisscrossed with shorter chains of poly(styrene-co-acrylonitrile). The nitrile groups from neighboring chains, being polar, attract each other and bind the chains together, making ABS stronger than pure polystyrene. The styrene gives the plastic a shiny, impervious surface. The butadiene, a rubbery substance, provides resilience even at low temperatures. ABS can be employed between −25 and 60° C.

In another exemplary non-limiting embodiment, the cable management apparatus 100 is fabricated from a non-ABS plastic such as polypropylene, low-density polyethylene (LDPE), and/or high-density polyethylene (HDPE). In another exemplary non-limiting embodiment, cable management apparatus 100 is fabricated from a non-plastic material such as, for example, but not limited to, metal, rubber, wood, and/or ceramic. When fabricated from a relatively non flexible material, widths and other dimensions can be chosen to be thin enough to provide the desired flexibility. Although illustrated as an oval shaped cable management apparatus 100, it should be appreciated that the cable management apparatus 100 can be a shape other than oval. For example, the shape can be circular or square or trapezoidal or any other shape.

In use, cable management apparatus 100 facilitates the routing of cable as set forth below in more detail. More particularly, and in reference to FIG. 1b, the cable management apparatus 100 holds cable in separate paths 112. For example, video cable can be routed through a first 136 path 112, audio cable through a second 138 path 112, and power cords through a third 140 path 112. In other words, the cable management apparatus 100 is, in one exemplary non-limiting embodiment, a one-piece easily manufactured and economical unitary product that facilitates the routing of different cable types into different cable paths. As illustrated in one exemplary non-limiting embodiment there are three paths 112, but it should be appreciated that there can be any number of paths.

Exemplary Non-Limiting Centrally Wide Grommet Cable Management Apparatus

Figure 2A:
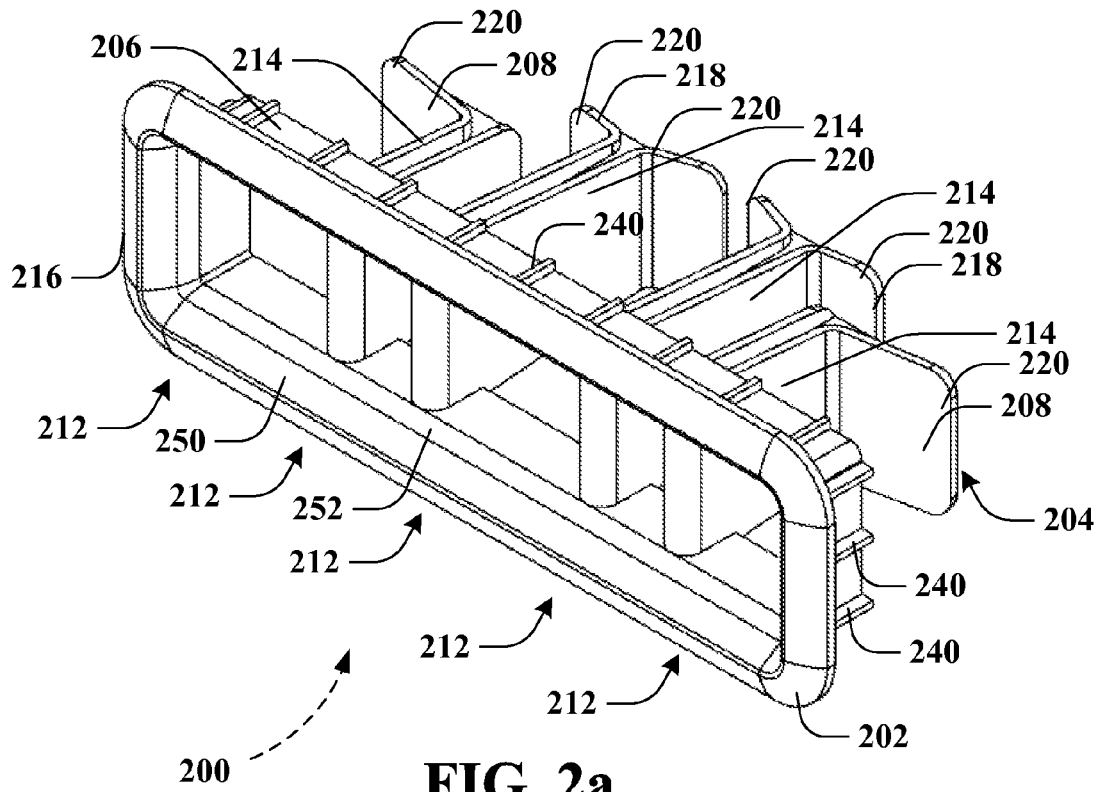
FIG. 2a is a front perspective view of a cable management apparatus in accordance with the innovation.
Figure 2B:
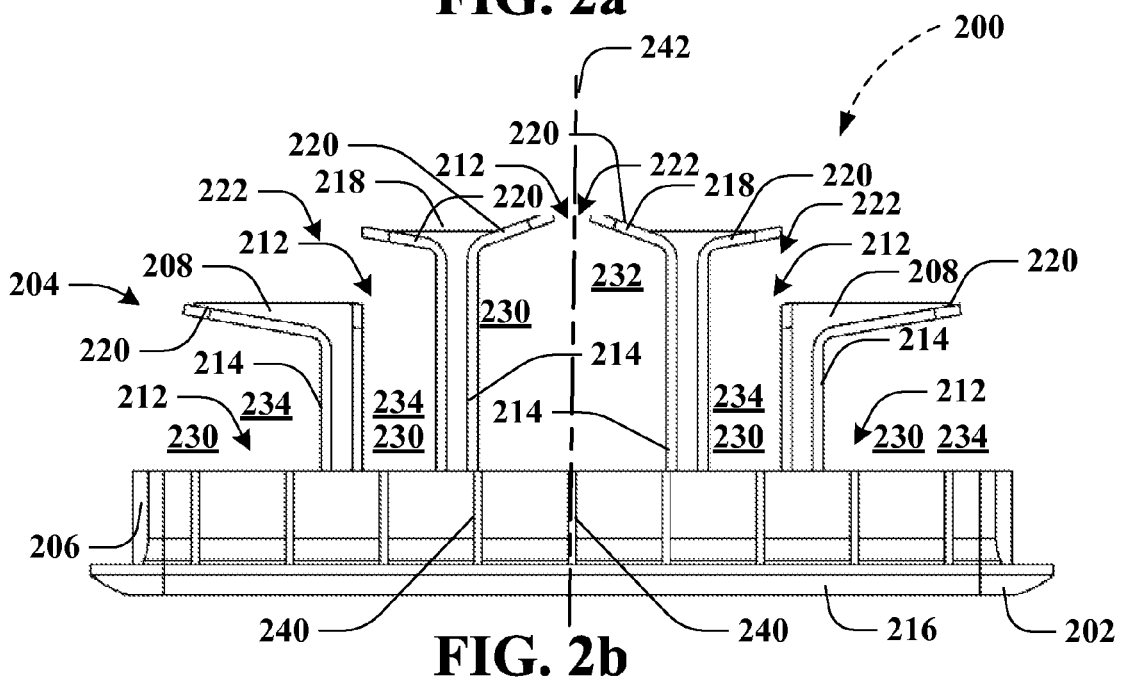
FIG. 2b is a side plan view of a cable management apparatus in accordance with the innovation.

FIGS. 2a and 2b illustrate an aspect of the innovation in which a centrally wide grommet cable management apparatus 200 is provided. The cable management apparatus 200 includes a flange 202 mate-able with an opening and a cable management structure 204 connected to the flange 202. In one exemplary non-limiting embodiment, the cable management apparatus 200 includes a collar member 206 coupling the flange 202 to the cable management structure 204. Two end guide members 208 extend from some of a plurality of walls 214 within the collar member 206, the walls 214 define a plurality of separate cable paths 212 through the collar member 206. In one exemplary non-limiting embodiment, the walls 214 are recessed with respect to a front portion 216 of flange 202. A plurality of inner guide members 218 extend from some of the walls 214, in one exemplary non-limiting embodiment. The end guide members 208 and the inner guide members 218 terminate at plate members 220.

More particularly, the plate members 220 of the inner guide members 218 extend angularly in both an internal direction (toward an axis 242) and an external direction (away from axis 242). As illustrated and best seen in FIG. 2b, the plate members 220 of the inner guide members 218 extend at about 10 degrees in the external direction and at about 30 degrees in the internal direction. The plate members 220 of the end guide members 218 extend in a plane parallel a plane defined by the front 216 of the flange 202. This parallelity is best seen in FIG. 2b. FIG. 2b also best illustrates that volumes 230 defined by the end guide members 208, the inner guide members 218, and edges of the cable management apparatus 200 are substantially larger (wider and taller) in a centrally defined volume 232 than in outer defined volumes 234 and in this respect the cable management apparatus 200 is a centrally wide grommet cable management apparatus 200. Additionally, unlike cable management apparatus 100, cable management apparatus 200 is substantially square shaped.

In one exemplary non-limiting embodiment, the plate members 220 are flexible and this flexibility facilitates the placement of a cable in the cable management apparatus 200 by allowing a cable to be passed into one of the separate paths 212 from the front side 216, through the collar 206 and placed above an end guide member 208 and an inner guide member 218 and then the cable can be pulled down resulting in a cable that horizontally enters the cable management apparatus 200 and then exits in a vertically down direction as shown in FIGS. 4b and 4c. Also, with a flexible cable, and the cable management apparatus 200 being in an opening, as the cable is passed through the front 216 of a separate path 212, gravity acts such that the cable exits in a downward direction, and a user can take the cable from the backside of the cable management apparatus 200 and pull the cable upwards through a gap 222 between the plate members 220 if an upward or horizontal cabling is desired. To facilitate the passing of cable through the cable management apparatus 200, the flange is stepped at 250 and at 252. As illustrated in one exemplary non-limiting embodiment, the cable management apparatus 200 includes four walls 214 creating five separate paths 212 for routing cable. The larger volume of volume 232 allows for more cabling there than at volumes 234. In other words, the cable management structure 204 includes at least four guide members 208 and 218 extending from the four walls 214 within the collar member 206 defining five containment areas for passing cable through, wherein a central area 232 is largest in volume, and a pair of areas 234 on a pair of ends are smaller in volume.

In one exemplary non-limiting embodiment, cable management apparatus 200 is fabricated from an ABS plastic as described above with reference to cable management apparatus 100. Additionally, as described above with reference to cable management apparatus 100, cable management apparatus 200 can be fabricated from a material other than ABS plastic. The cable management apparatus 200 can be surface mounted using an adhesive to glue the cable management apparatus 200 to the surface of a structure such as a back wall of an entertainment center.

In use, cable management apparatus 200 facilitates the routing of cable as set forth below in more detail. More particularly, cable management apparatus 200 holds cable in separate paths 212. For example, video cable can be routed through a first path 212, audio cable through a second path 212, and power cords through a third path 112. In other words, the cable management apparatus 200 is, in one exemplary non-limiting embodiment, a one-piece unitary easily manufactured and economical product that facilitates the routing of different cable types into different cable paths. Additionally, in some environments, there can be a desire to route more of a Cable A than a Cable B, and volume 232 can be used to route Cable A, while one of volumes 234 can be used to route Cable B.

Exemplary Non-Limiting Centrally Wide Grommet Cable Management Apparatus

Figure 3A:
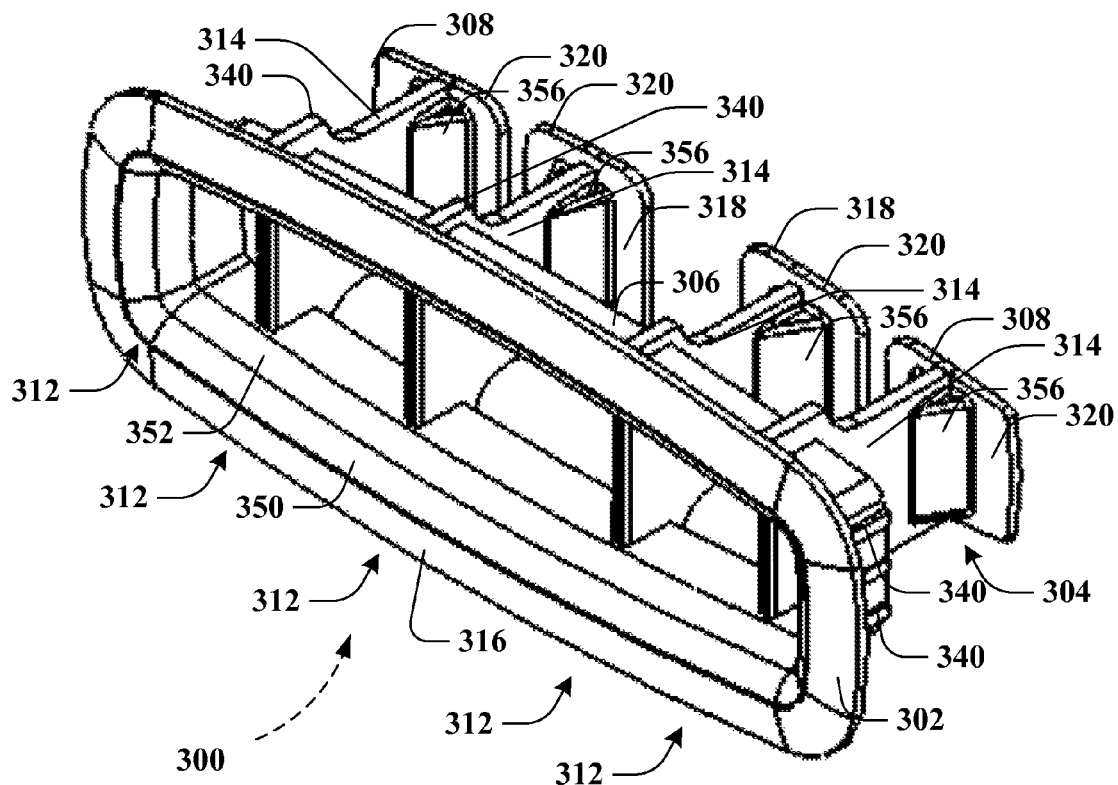
FIG. 3a is a front perspective view of a cable management apparatus in accordance with the innovation.
Figure 3B:
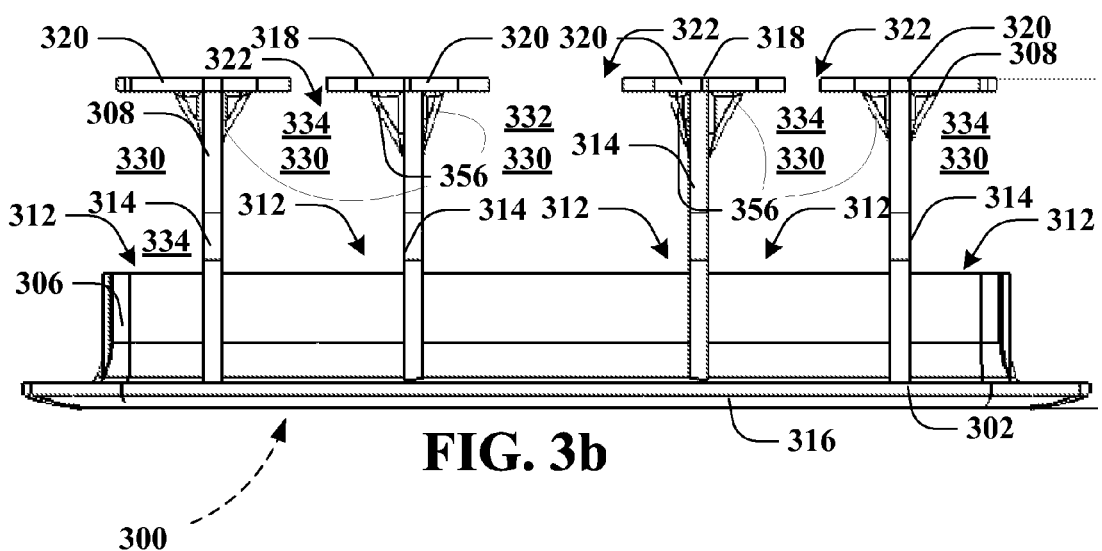
FIG. 3b is a side plan view of a cable management apparatus in accordance with the innovation.

FIGS. 3a and 3b illustrate an aspect of the innovation in which a centrally wide grommet cable management apparatus 300 is provided. The cable management apparatus 300 includes a flange 302 mate-able with an opening and a cable management structure 304 connected to the flange 302. In one exemplary non-limiting embodiment, the cable management apparatus 300 includes a collar member 306 coupling the flange 302 to the cable management structure 304. Two end guide members 308 extend from some of a plurality of walls 314 within the collar member 306, the walls 314 define a plurality of separate cable paths 312 through the collar member 306. The walls extend past the collar member 306 to form support ribs 340 also. In one exemplary non-limiting embodiment, the walls 314 are recessed with respect to a front portion 316 of flange 302. A plurality of inner guide members 318 extend from some the walls 314, in one exemplary non-limiting embodiment. The end guide members 308 and the inner guide members 318 terminate at plate members 320.

As illustrated and best seen in FIG. 3b, the plate members 320 extend in a plane parallel a plane defined by the front 316 of the flange 302. This parallelity is best seen in FIG. 3b. FIG. 3b also best illustrates that volumes 330 defined by the end guide members 308, the inner guide members 318, and edges of the cable management apparatus 300 are substantially larger (wider) in a centrally defined volume 332 than in outer defined volumes 334 and in this respect the cable management apparatus 300 is a centrally wide grommet cable management apparatus 300. In other words, the cable management structure 304 includes at least four guide members 308 and 318 extending from the four walls 314 within the collar member 306 and defines five containment areas for passing cable through, wherein a central area 332 is largest in volume, and a pair of areas 334 on a pair of ends are smaller in volume. The volume differences can be due to width only as in cable management apparatus 300, or can be due to height differences as with respect to cable management apparatus 200. Additionally, unlike cable management apparatus 100, cable management apparatus 300 is substantially square shaped.

In one exemplary non-limiting embodiment, the plate members 320 are flexible and this flexibility facilitates the placement of a cable in the cable management apparatus 300 by allowing a cable to be passed into one of the separate paths 312 from the front side 316, through the collar 306 and placed above an end guide member 308 and an inner guide member 318 and then the cable can be pulled down resulting in a cable that horizontally enters the cable management apparatus 300 and then exits in a vertically down direction as illustrated in FIGS. 4b and 4c.

Also, with a flexible cable, and the cable management apparatus 300 being in an opening, as the cable is passed through the front 316 of a separate path 312, gravity acts such that the cable exits in a downward direction, and a user can take the cable from the backside of the cable management apparatus 300 and pull the cable upwards through a gap 322 between the plate members 320 if an upward or horizontal cabling is desired. To facilitate the passing of cable through the cable management apparatus 300, the flange is stepped at 350 and at 352. In one exemplary non-limiting embodiment, cable management apparatus 300 includes a plurality of support ribs 356 and the plates 320 are not flexible. As illustrated in one exemplary non-limiting embodiment, the cable management apparatus 300 includes four walls 314 creating five separate paths 312 for routing cable. The larger volume of volume 332 allows for more cabling there than at volumes 334.

In one exemplary non-limiting embodiment, the cable management apparatus 300 is fabricated from an ABS plastic as described above with reference to cable management apparatus 100. Additionally, as described above with reference to cable management apparatus 100, cable management apparatus 300 can be fabricated from a material other than ABS plastic. The cable management apparatus 300 can be surface mounted using an adhesive to glue the cable management apparatus 300 to the surface of a structure such as a back wall of an entertainment center.

In use, cable management apparatus 300 facilitates the routing of cable as set forth below in more detail. More particularly, cable management apparatus 300 holds cable in separate paths 312. For example, video cable can be routed through a first path 312, audio cable through a second path 312, and power cords through a third path 312. In other words, the cable management apparatus 300 is, in one exemplary non-limiting embodiment, a one-piece unitary easily manufactured and economical product that facilitates the routing of different cable types into different cable paths. Additionally, in some environments, there can be a desire to route more of a Cable A than a Cable B, and volume 332 can be used to route Cable A, while one of volumes 334 can be used to route Cable B.

Exemplary Non-Limiting Cable Management Apparatus Environments

FIGS. 4a, 4b, and 4c illustrate an exemplary non-limiting cable management apparatus environment 400. FIG. 4a is a back perspective horizontal view, FIG. 4b is a front perspective vertical view, and FIG. 4c is a back perspective vertical view of the environment 400 including a plurality of cable management apparatus 100 mounted to a wall 402 such as, for example, but not limited to a back wall of an entertainment center. Although the following environments and/or embodiments are described in terms of cable management apparatus 100, any of cable management apparatuses 100, 200, and 300 can be employed. The wall 402 includes a plurality of openings that allow for insertion of a cable management apparatus 100 and for cable 404 to go through the wall 402. The cable management apparatuses 100 can be arranged in a matrix or array of rows and columns, or just in a row or a column.

Typically, and as best seen in FIG. 4a, the cable makes a 90 degree turn when passing through a cable management apparatus 100. However, the cable management apparatus 100 facilitates the routing of cable 404 at any desired degree turn. Additionally, and as explained in more detail below, the cable management apparatus 100 facilitates the storage of extra lengths of cable. For example, and looking at FIG. 4c, any of the three cables 404 can be looped around either end guide members 108 or inner guide members 118 of any of the cable management apparatuses 100 on wall 402 before entering wall 402. For example, the cable 404 going to the top cable management apparatus 100 can be routed to the top cable management apparatus 100 then to the bottom cable management apparatus 100 and then back to the top cable management apparatus 100 and then though the wall 402.

Wall 402 can be a wall behind a display in a store or other location (such as a trade show) displaying wired devices such as media devices. The cable 404 can be warped in a FIG. 8 pattern around one or more cable management apparatus(es) 100 to facilitate storage of excess cable. The cable management apparatuses 100 are both appropriately sized and positioned such that the cable is not bent past the cable's bend radius when being looped around a cable management apparatus 100. The bend radius, which is measured to the inside curvature, is the minimum radius one can bend a pipe, tube, sheet, cable or hose to without kinking it, damaging it, or shortening its life.

Figure 5:
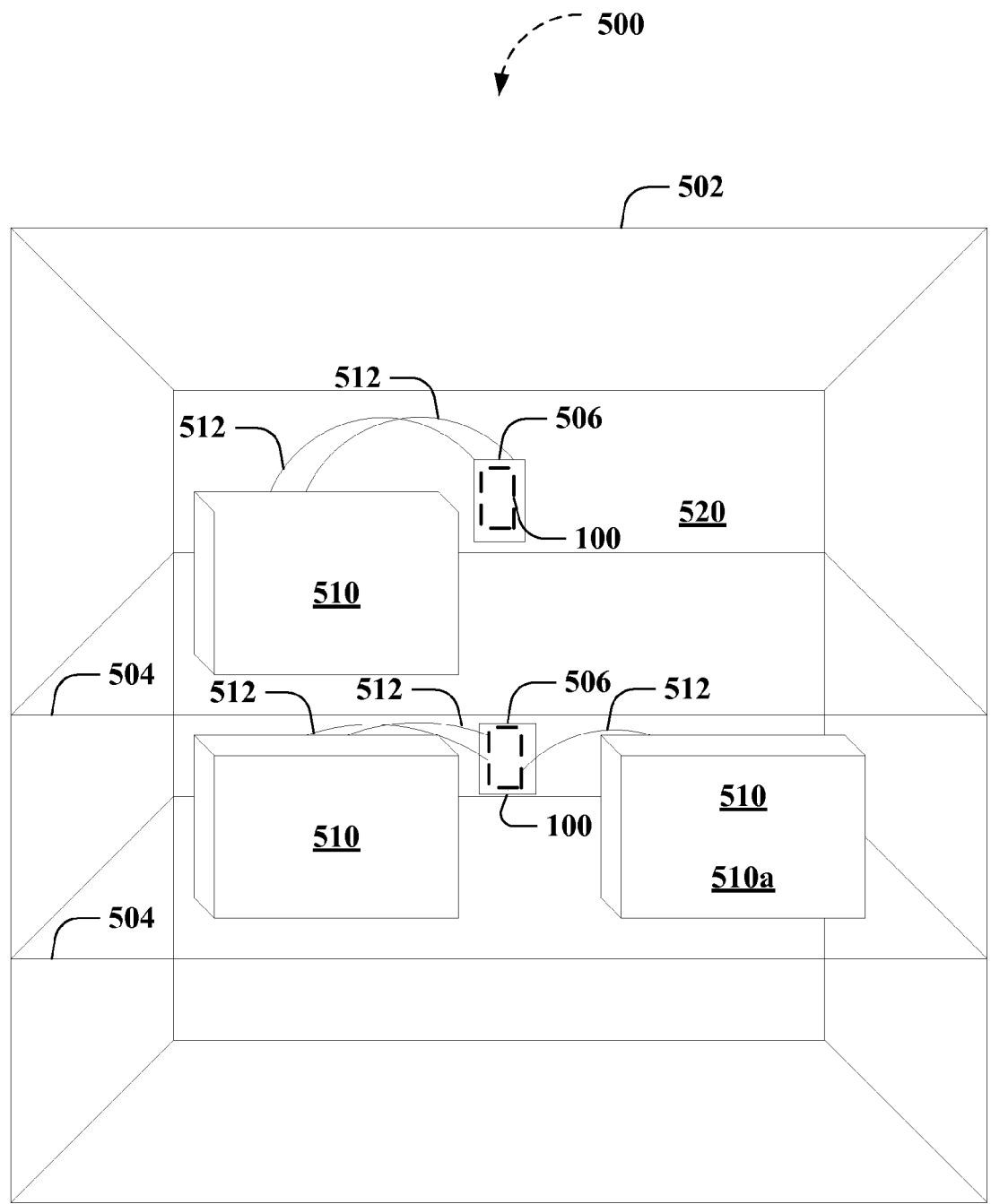
FIG. 5 illustrates a furniture structure environment in accordance with the innovation.

FIG. 5 illustrates a furniture structure environment 500. An entertainment cabinet 502 includes a plurality of shelves 504 and a plurality of openings 506. The shelves 504 are such that a plurality of media devices 510 can be placed or positioned on the shelves. One media device 510 can be a display device 510a. Each device has at least one associated cable 512, but it should be appreciated that objects without cables can be placed or positioned on the shelves 504. The entertainment cabinet 502 includes a back wall 520 similar to the wall shown in FIGS. 4a-4c, and a cable management apparatus 100 is shown in phantom on a backside of wall 520 in the openings 506. It should be appreciated that multiple cable management apparatuses 100 can be positioned or placed on wall 520 in arrangements as illustrated in FIGS. 4a-4c as well as any other arrangement.

Figure 6:
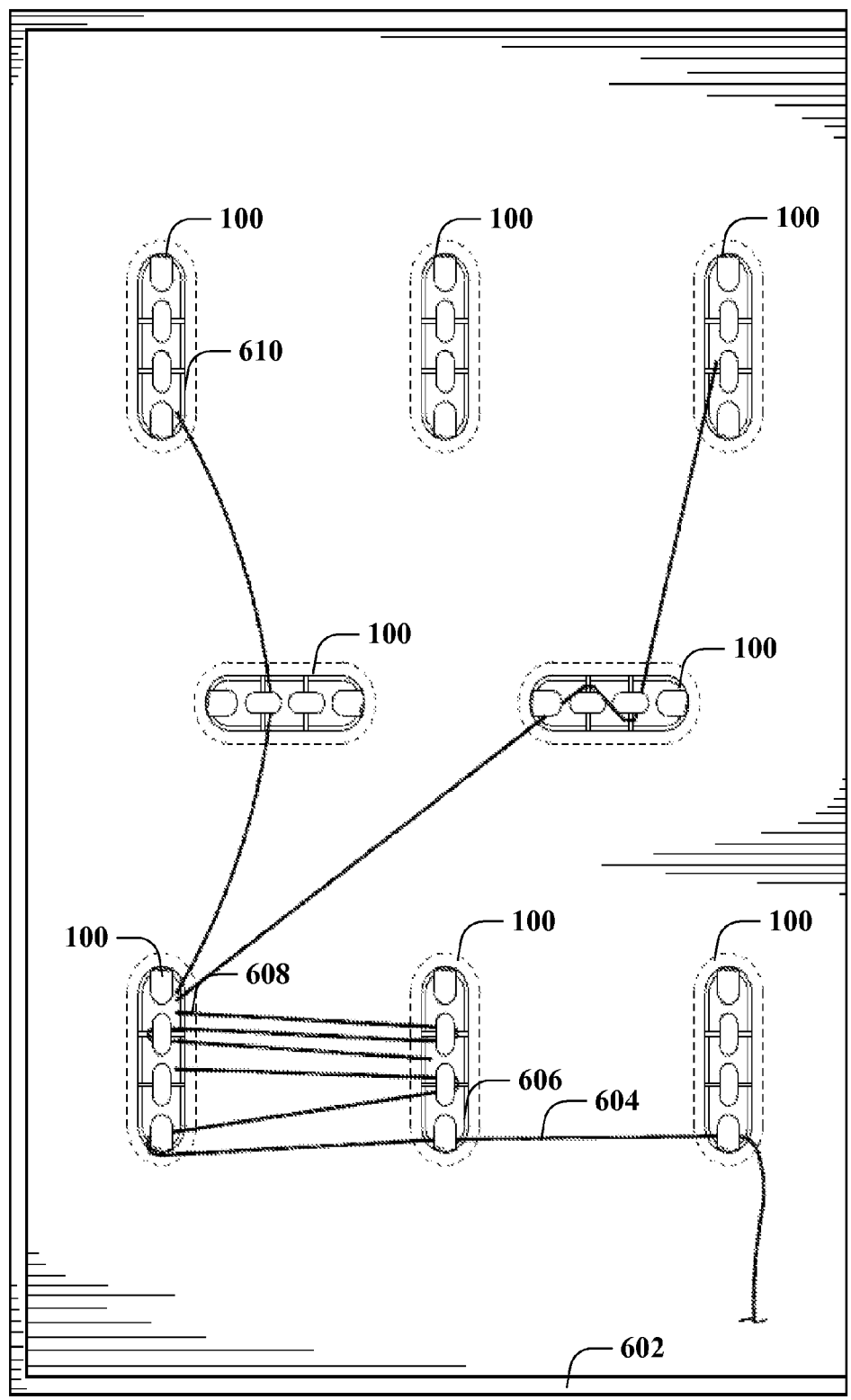
FIG. 6 illustrates a cable storage embodiment in which a wall has a plurality of cable management apparatuses positioned thereon.

FIG. 6 illustrates a cable storage embodiment 600 in which a wall 602 has a plurality of cable management apparatuses 100 positioned thereon. A cable 604 is routed through a first cable management apparatus 606 to a second cable management apparatus 608, and then finishing at a third cable management apparatus 610 where the cable is passed through the wall or surface 602. As illustrated, the cables 604 can be wrapped around several cable management apparatuses 100 before being passed through a particular cable management apparatuses 100. Accordingly, excess cable storage is provided.

While the present innovation has been described in connection with the exemplary embodiments of the various Figures, it is to be understood that other similar embodiments may be employed or modifications and additions may be made to the described embodiment for performing the same function of the present innovation without deviating therefrom. For example, one skilled in the art will recognize that the present innovation as described in the present application may apply to any cable management environment, and may be applied to any number of such devices, peripherals, and storage. Therefore, the present innovation should not be limited to any single embodiment, but rather should be construed in breadth and scope in accordance with the appended claims.

What is claimed is:

1. A one-piece cable management apparatus including:
a collar member, having a continuous outer periphery, a first end, and a second end;
a flange connected to the first end of the collar member; and
a cable management structure extending from the second end of the collar member via at least one connection portion wherein:
the at least one connection portion defines a first plane; and
the cable management structure comprises a plurality of guide members, each having a connecting end connected to the second end of the collar member, and extending outward from the collar member in a direction perpendicular to the first plane, and wherein the cable management structure is configured to redirect at least two cables passing through the collar member via at least two separated apertures.

2. The cable management apparatus of claim 1, wherein the plurality of guide members have a cable management end opposite the connecting end.

3. The cable management apparatus of claim 2, wherein the cable management structure includes a plurality of separate cable paths.

4. The cable management apparatus of claim 2, wherein the plurality of guide members includes at least one end guide member extending away from an edge of the collar member.

5. The cable management apparatus of claim 4, wherein the plurality of guide members includes at least one inner guide member extending from a wall within the collar member.

6. The cable management apparatus of claim 2, wherein the plurality of guide members includes at least two end guide members extending from an edge of the collar member opposite one another and two inner guide members extending from two walls within the collar member.

7. The cable management apparatus of claim 6, wherein the walls are recessed with respect to a front of the flange.

8. The cable management apparatus of claim 6, wherein the collar member includes a plurality of support ribs.

9. The cable management apparatus of claim 6, wherein the end guide members and the inner guide members terminate at arcuate members which are parallel to the first plane.

10. The cable management apparatus of claim 9, the inner guide members' arcuate members are ovals and the end guide members' arcuate members are half ovals.

11. The cable management apparatus of claim 1, wherein the cable management structure includes at least one guide member extending from a wall within a collar member.

12. The cable management apparatus of claim 1, wherein the cable management structure includes at least four guide members extending from four walls within the collar member defining five containment areas for passing cable through, wherein a central area is largest in volume, and a pair of areas on a pair of ends are smaller in volume.

13. The cable management apparatus of claim 1, wherein the cable management structure includes at least four guide members extending from four walls within the collar member defining five containment areas for passing cable through, wherein a central area is largest in volume and width, and a pair of areas on a pair of ends are smaller in volume and width.

14. The cable management apparatus of claim 1, wherein the cable management structure includes at least four guide members extending from four walls within the collar member defining five containment areas for passing cable through, wherein a central area is largest in volume and height, and a pair of areas on a pair of ends are smaller in volume and height.

15. The cable management apparatus of claim 1, wherein the cable management structure includes at least four guide members extending from four walls within the collar member defining five containment areas for passing cable through, each guide member terminating at end plates which are parallel to the first plane.

16. A one-piece cable management system comprising:
a surface including a plurality of openings; and
a plurality of one-piece cable management apparatuses inserted into at least two of the plurality of openings, each one-piece cable management apparatus including:
a collar member, having a continuous outer periphery, a first end, and a second end;
a flange, connected to the first end of the collar member and mated with the opening into which it is inserted; and a cable management structure extending from the second end of the collar member via a connection area wherein:

the connection area of the cable management structure to the second end of the collar member defines a plane; and the cable management structure comprises a plurality of guide members, each having a connecting end connected to the collar member, and extending outward from the collar member in a direction approximately perpendicular to the plane, and wherein the cable management structure is configured to redirect at least two cables passing through the collar member via at least two separated apertures.

17. The system of claim 16 wherein the cable management structure is positioned such that the flange is on one side of the opening, the collar member is disposed within the opening, and the cable management structure protrudes from the other side of the opening.

18. A furniture structure, comprising:

a surface capable of supporting an entertainment device;

at least one outwardly facing section, wherein the at least one outwardly facing section includes an opening and defines a plane; and a one-piece cable management apparatus disposed in the opening, the cable management apparatus comprising:

a collar member having a front end and a rear end, wherein the collar member is positioned in the opening;

a flange, connected to the front end of the collar member and mating with the opening; and a cable management structure extending from the rear end of the collar member wherein the cable management structure comprises a plurality of guide members, each having a connecting end connected to the rear end of the collar member, and extending away from the collar member in a direction perpendicular to the plane, wherein the cable management structure is configured to redirect at least two cables passing through the collar member via at least two separated apertures in a direction which is substantially perpendicular to the plane, to a new direction which is substantially parallel to the plane.

19. The furniture structure of claim 18, wherein the cable management structure protrudes from the side of the opening opposite the flange.

20. The furniture structure of claim 19, wherein the cable management structure includes at least one end guide member extending from an edge of the collar member.

* * * * *